United States Patent [19]

Oosterkamp

[11] Patent Number: 5,098,646
[45] Date of Patent: Mar. 24, 1992

[54] PASSIVE HYDRAULIC VACUUM BREAKER

[75] Inventor: Willem J. Oosterkamp, Los Gatos, Calif.

[73] Assignee: General Electric Company, San Jose, Calif.

[21] Appl. No.: 633,747

[22] Filed: Dec. 20, 1990

[51] Int. Cl.$^5$ .............................................. G21C 15/18
[52] U.S. Cl. .................................. 376/283; 376/282; 376/293; 376/299
[58] Field of Search ............... 376/283, 293, 294, 285, 376/284, 299, 282

[56] References Cited

U.S. PATENT DOCUMENTS

| | | | |
|---|---|---|---|
| 4,610,840 | 9/1986 | Leach | 376/283 |
| 4,948,554 | 8/1990 | Gou et al. | 376/283 |
| 5,011,652 | 4/1991 | Tominaga et al. | 376/283 |

Primary Examiner—Brooks H. Hunt
Assistant Examiner—Frederick H. Voss
Attorney, Agent, or Firm—Robert R. Schroeder

[57] ABSTRACT

The present invention is directed to a nuclear reactor facility wherein a nuclear reactor pressure vessel (RPV) is housed within an annular sealed drywell, an annular sealed wetwell houses said drywell, a pressure suppression pool of liquid is disposed in said wetwell and is connected to said drywell by submerged vents, a condenser line connects said drywell to an isolation condenser, and a bleedline from said isolation condenser is connected to said pool and terminates under the surface of said pool. The improvement of the present invention comprises a liquid reservoir disposed in said drywell and a standpipe disposed in said wetwell. The reservoir and the standpipe are connected by a duct which is located below the surface of said reservoir a distance, D. The area of the reservoir is at least 25 times larger than the area of said standpipe.

5 Claims, 2 Drawing Sheets

PASSIVE HYDRAULIC VACUUM BREAKER

BACKGROUND OF THE INVENTION

The present invention relates to nuclear boiling water (BWRs) and more particularly to containment utilizing lateral vents.

Existing large BWRs are of the forced-circulation type. In BWRs undergoing power generation operations, reactor coolant, initially in the form of sub-cooled liquid (e.g. water), is circulated by main coolant recirculation devices (e.g. jet pumps or mixed-flow motor-driven pumps) around a path a portion of which is comprised of the core lower plenum region (located at the bottommost section of the reactor), thence through the nuclear core and into a core upper plenum in communication with the core. Flow exiting the core upper plenum then passes through standpipes that lead to an assembly of steam separators. The reactor coolant exiting the nuclear core and passing into the core upper plenum is a two-phase mixture of steam and water, the proportion of which varies depending upon such factors as the power output from the fuel bundles, the amount of sub-cooling present in the coolant entering the fuel bundle, and the amount of flow through the bundles. This last factor depends on the power of the recirculation pumps and the hydrodynamic flow resistance presented by the fuel bundle geometry and wetted surfaces, and the amount of orificing representing restrictions to flow just prior to the coolant's entrance into the core fuel assembly.

Joining with the core effluent in the core upper plenum is the core "by-pass" flow, which is reactor coolant that has flowed from the core lower (entrance) plenum into the region external to the fuel assembly channels (but inside the core shroud), thence upwardly generally through the region occupied by cruciform-shaped control blades which stand in various degrees of insertion into the core, thence across the upper grid member (called the "top guide") which with its lattice-like configuration keeps the fuel assemblies in a regular array, and finally into the core upper plenum. This by-pass coolant stream at its discharge into the core upper plenum is compromised substantially of saturated liquid, with perhaps a small amount of steam. Within the core upper plenum, these two effluents—by-pass flow and fuel bundle exit flow—rapidly mix together and quickly lose identity from their origins.

Mechanical steam separation can be utilized to accomplish the separation of the steam from the steam/water mixture exiting the core. Some earlier BWR designs used free-surface steam separation where, just as in the household tea kettle, steam separates unaided from the free-surface, and saturated water remains in the bulk coolant, which in BWRs is recirculated back down the downcomer annulus. This type of steam separation is feasible so long as the steam-leaving velocity, i.e. the bulk average velocity of the steam taken across the available pathway flow area, is not large, i.e. is no greater than about 1.8 foot/second. If steam-leaving velocities exceed this value, there tends to be carried along with the steam an unacceptably high moisture content. The high moisture levels saturate the moisture-drying abilities of the steam dryer, thus resulting in an unacceptably high moisture content in the steam leaving the reactor and supplied to the turbine. When steam moisture contents are too high in the turbine steam flow, accelerated erosion can occur on first-stage turbine blades and the efficiency of the turbine is reduced.

It is possible to obtain free-surface separation capabilities if the reactor pressure vessel (RPV) cross-sectional area is made sufficiently large. However, cost economies dictate that minimum diameter RPVs be used, so that mechanical steam separation has been developed to handle the high power output steam production levels of modern BWRs. In these latter designs, the steam bulk average velocity moving through the wet steam plenum region immediately downstream of the mechanical steam separators is about 5 feet/second.

The fuel assemblies grouped over the central region of the core tend to have higher exit steam qualities than do bundles located at the peripheral region of the core. It is desirable, nonetheless, that the flow rates and steam/water mixture proportions entering the steam separator standpipes be relatively uniform. To facilitate gaining more nearly uniform steam/water mixture for entry into the standpipes, the standpipe entrances are separated from the fuel assemblies by a distance of, for example, about 5 feet. Turbulent mixing occurring between the plumes leaving adjacent fuel assemblies, each with a different void content, is one mechanism acting to produce a more nearly uniform mixture which enters into the steam separator standpipes. More important to achieving flow mixture uniformity, however, is the hydrodynamic flow resistance represented by the standpipes, each with their end-mounted steam separators. Complete flow mixture uniformity entering the standpipes is at best difficult to achieve and, even with a five-foot separation between fuel assembly exits and standpipe entrances, it is not a design basis used for reactor performance evaluations.

The steam separator assembly consists of a domed or flat-head base on top of which is welded an array of standpipes with a three-stage steam separator, for example, located at the top of each standpipe. One function of the standpipes is to provide a stand-off separation of the larger-diameter steam separators, which are generally arranged in a particularly tightly-compacted arrangement in which external diameters of adjacent separators are nearly touching with each other, so that separated liquid coolant discharged at the bottom of the separator has a more "open" flow path outwardly from the reactor longitudinal axis and out to the downcomer annulus region which lies at the inboard periphery to the RPV. A second purpose for the standpipes is a high-power-output natural-circulation reactor using mechanical steam separators is to provide juxtaposed regions which promote natural-circulation by means of a vertical region of two-phase (and, thus, low-density) coolant inside the standpipes which is juxtaposed against single-phase liquid coolant outside the standpipes in a so-called "downcomer region", in which region height provides a very significant part of the total natural circulation driving head for coolant flow circulation within the reactor.

The steam separator assembly rests on the top flange of the core shroud and forms the cover of the core discharge plenum ("core upper plenum") region. The seal between the separator assembly and core shroud flange is a metal-to-metal contact and does not require a gasket or other replacement sealing devices. The fixed axial flow type steam separators have no moving parts and are made of stainless steel, for example, to resist corrosion and erosion.

In each separator, the steam/water mixture rising through the standpipes (the "standpipe region") impinges upon vanes which give the mixture a spin, thus enabling a vortex wherein the centrifugal forces separate the water from the steam in each of three stages. Steam leaves the separator at the top of this assembly and passes into the wet steam plenum below the dryer. The separated water exits from the lower end of each stage of the separator and enters the pool (the "downcomer region") that surrounds the standpipes to join the downcomer flow. The steam exiting from all separators either may be in the same horizontal plane, or the separators may be arranged in a slightly crowned fashion at the center to compensate for the crowned water gradient of the pool surrounding the standpipes.

The steam separator assembly may be bolted to the core shroud flange by long hold-down bolts, or the separator together with the dryer assembly may be held down onto the core shroud flange by contact from the reactor head when the latter is assembled to the reactor vessel. The nominal volumetric envelope of the steam separator assembly is defined by the horizontal plane of its lower flange that contacts the core shroud flange, its cylindrical sides that provide part of the five-foot standoff from the fuel assembly exits, the circumscribed diameter of the outermost row of standpipes, the circumscribed diameter of the outermost row of steam separators, and the generally horizontal plane of the exits to the steam separators.

The core upper plenum region in a BWR currently under design known as the "simplified boiling water reactor" (SBWR) is substantially devoid of other mechanical devices, pipes, or structures; whereas the core upper plenum of a BWR/6 and "advanced boiling water reactor" (ABWR) reactor design generally contains spargers and nozzles for core sprays, and distribution headers for core flooders, respectively. In both reactor types, these spargers/headers are located at the outer periphery of the core upper plenum, mounted below the core shroud flange so that the sparger/header is clear of the refueling removal path of peripheral fuel assemblies and, thus, do not become removed during core refueling operations.

With specific reference to a natural-circulation SBWR, it will be observed that there are no recirculation pumps to aid in coolant recirculation. Steam generation in the core produces a mixture of steam and water which, because of steam voids, is less dense than saturated or sub-cooled water. Thus, the boiling action in the core results in buoyancy forces which induce core coolant to rise upwardly, to be continuously replaced by non-voided coolant arriving from beneath the core in the core lower plenum region. As the coolant leaves the core, it rises through the core upper plenum region, then through the standpipes region, and finally into the steam separators. This voided mixture inside these standpipes continues to be less dense than non-voided coolant external to the standpipes, resulting in the development of additional buoyancy force to further drive the coolant circulation. That this process is quite effective in promoting coolant recirculation can be noted from reported tests made in forced-circulation power reactors where the coolant circulation pumps are shut off. Even with their relatively short steam separator standpipes, reactor power levels of 25% and coolant flow rates of 35% of rated flow, are readily and safely maintainable.

The SBWR reactor is but modestly different from the forced-circulation BWR, with the most prominent differences being that the standpipes region is to be considerably longer in the SBWR (to develop a higher differential head), the core overall height may be somewhat shorter (for example, being 8 or 9 feet active fuel length versus 12.5 feet active fuel length in recent forced-circulation reactors), and the core power density will be somewhat lower. The severity of orificing—a means to promote hydrodynamic stability—at the entrance to the BWR fuel bundles may be lessened. The fuel bundle may have a larger diameter fuel rod in, for example, a $6 \times 6$ rod array, whereas the rod array for a forced-circulation reactor often is an $8 \times 8$ rod array. The design flow rates per fuel bundle, and the flow rates per steam separator, will be somewhat reduced in the SBWR design. Fuel exit steam quality will be approximately the same between the two designs. In the SBWR reactor design, no spargers or discharge headers are installed in the core upper plenum, while in the ABWR reactor, spargers or discharge headers are installed in the upper core plenum.

In some versions of SBWR reactors under study, the standpipes are very long while the core upper plenum is short. In other versions, the converse is true. The present invention is applicable equally in either version.

With respect to safety aspects of BWRs, the most serious credible reactor accident is in general conceived as a rupture of the reactor pressure vessel (RPV) or of a major coolant line connected to the vessel. Such an occurrence is known as a loss of coolant accident (LOCA). To prevent the release of toxic products resulting from such an accident, the RPV is placed within a series of containment structures. BWRs have a primary and a secondary containment structure. The primary containment vessel consists of a drywell and a wetwell. In a majority of BWRs operating in the 1970's, the drywell is a steel pressure vessel shaped like an electrical light bulb. It is designed for a pressure of 350 kPa(g) and is tested above 420 kPa(g). The steel vessel is enclosed in a thick, reinforced concrete structure which provides the mechanical strength and also serves as a radiation seal. The drywell contains the reactor and the coolant recirculation pumps. The secondary containment vessel or shield building commonly is a rectangular structure of reinforced concrete about 1.0 m thick.

In more recent BWRs, the drywell is a concrete cylinder with a domed top. The wetwell is an annular chamber in which the water is retained by an interior rear wall and by the steel cylinder that is the primary containment structure. Connection between the drywell and the wetwell is provided by a number of horizontal cylindrical vents in the lower part of the drywell wall. A reinforced concrete shield building constitutes the secondary containment.

During a LOCA, the steam released by the flashing of the coolant water would be forced into the water of the wetwell and be condensed, thereby lowering the temperature and pressure of the drywell atmosphere. Hence, the wetwell commonly is referred to as the pressure suppression pool.

The development of vertical layer lateral vents for the pressure suppression pool is disclosed in U.S. Pat. No. 3,115,450. Such lateral vent concept allows a gradual increase in the air clearing load to the pressure suppression pool. In the SBWR, and possibly larger BWRs with passive features, there will be an advantage in using the heat sink offered by the several millions of kilograms of water comprising the suppression pool for the long term cooling of the containment. In the SWBR, long term heat removal is assured by the isolation condensers, but they require some bleeding to the pressure suppression pool to remove non-condensable gases that can otherwise accumulate in the isolation condensers, reducing their heat transfer capabilities. The outlet of this bleedline must be less submerged in the pressure suppression pool than the elevation of the uppermost horizontal vent on the drywell side of the drywell-wetwell boundary. This feature allows the pressure difference between the drywell and wetwell to drive any steam plus non-condensible mixture through the isolation condensers and to drive any residual steam vapor plus non-condensibles downstream into the wetwell. The pressure in the drywell of the BWR containment may become sub-atmospheric when cold water is injected into the RPV and the RPV overflows or the water spills out through the break. The containment liner, usually made of thin steel plates welded together and anchored to the containment wall, will not withstand negative pressures and will fail. Conventionally, a vacuum breaker is installed between the wetwell and the drywell which consists of a check valve which opens at a predetermined pressure differential, e.g. 4 kPa. However, there is a potential danger that this check valve will stay open. The envisaged design of the isolation condenser of the SBWR is dependent upon a higher pressure in the drywell than in the wetwell in order for non-condensibles to be transported by the bleedline to the wetwell. There is no pressure differential between the drywell and the wetwell with a vacuum breaker valve stuck in an open position. Also, there is no head between the isolation condenser and the wetwell, and correspondingly, no transport of non-condensibles to the wetwell. Gas blanketing of the isolation condenser cannot be excluded, as the non-condensibles accumulate in the isolation condenser. This will result in insufficient heat removal with consequent possible failure of the containment.

BROAD STATEMENT OF THE INVENTION

The present invention is directed to a nuclear reactor facility wherein a nuclear reactor pressure vessel (RPV) is housed within an annular sealed drywell, an annular sealed wetwell houses said drywell, a pressure suppression pool of liquid is disposed in said wetwell and is connected to said drywell by submerged vents, a condenser line connects said drywell to an isolation condenser, and a bleedline from said isolation condenser is connected to said pool and terminates under the surface of said pool. The improvement of the present invention comprises a liquid reservoir disposed in said drywell and a standpipe disposed in said wetwell. The reservoir and the standpipe are connected by a duct which is located below the surface of said reservoir a distance, D. The area of the reservoir is at least 25 times larger than the area of said standpipe.

Advantages of the present invention include a hydraulic vacuum breaker that fulfills the functions of conventional mechanical vacuum breakers. Another advantage is a hydraulic vacuum breaker that operates in a passive manner, i.e. has no moving parts to fail. A further advantage is a hydraulic vacuum breaker that is amenable for installation within the design parameters of nuclear reactors, especially. These and other advantages will be readily apparent to those skilled in the art based on the disclosure contained herein.

The drawings will be described in detail below.

DETAILED DESCRIPTION OF THE INVENTION

Figure 1:
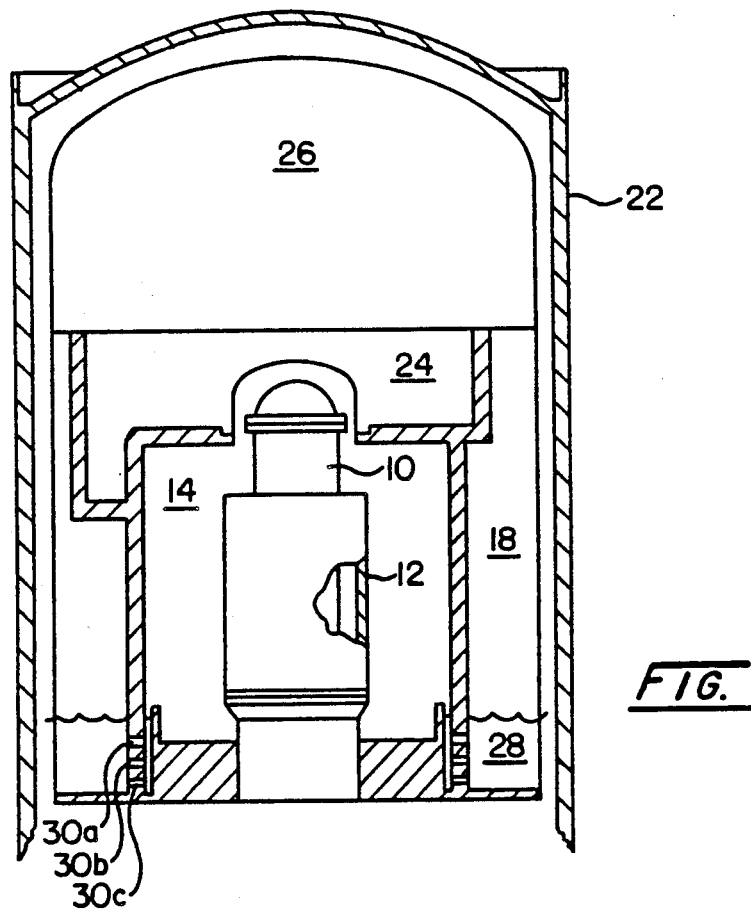
FIG. 1 is a simplified cross-sectional elevational view of a reactor building showing the nuclear reactor vessel and associated containment.

Referring initially to FIG. 1, reactor 10 can be seen to be housed within reactor shield wall 12. In turn, such assembly is located in drywell 14 which is formed by drywell wall 16. Annular drywell 14, in turn, is housed within annular wetwell 18 which is defined by containment 20. Shield building 22 completes the reactor building. Disposed overhead is upper pool 24 which, in turn, is surmounted by containment space 26 formed in the dome of shield building 22. Annular pressure suppression pool 28 is contained within wetwell 18 and connects drywell 14 and wetwell 18 via vertically-stacked, laterally-opening submerged vents, e.g. vents 30a–30c. The configuration of vents 30a–30c depicted at FIG. 1 is representative of conventional design.

Figure 2:
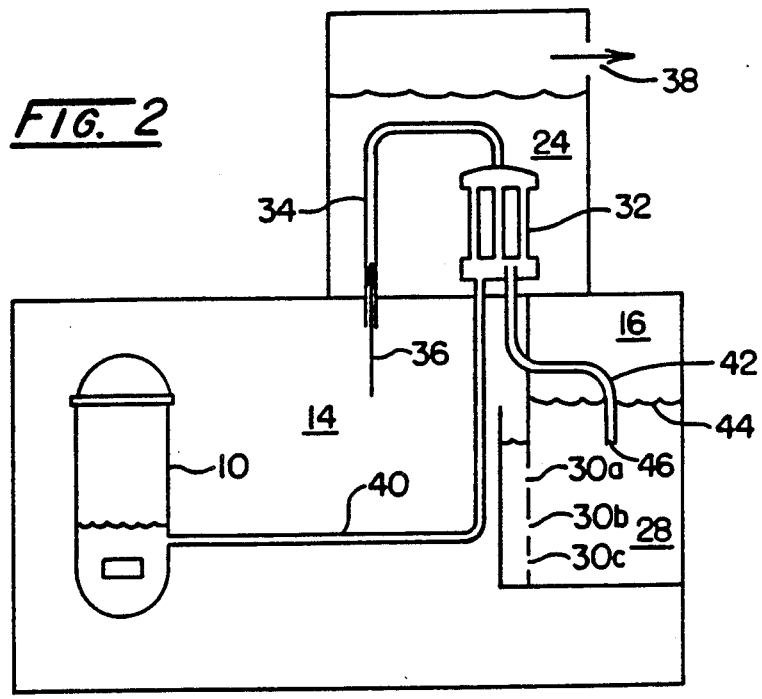
FIG. 2 is a simplified schematic showing the steam mixture pathway during blowdown.

With respect to implementation of the vertical layered lateral vent arrangement set forth at FIG. 1, reference is made to FIG. 2. Reactor vessel 10 is seen to be housed within drywell 14 which is in communication with isolation condenser 32 via line 34. Steam and non-condensible mixture can flow in the direction of arrow 36 via line 34 into isolation condenser 32 that is disposed within upper pool 24. Steam can be exhausted via vent 38. Condensate is returned from isolation condenser 32 to vessel 10 via line 40. Bleed line 42 runs from isolation condenser 32 to pressure suppression pool 28 with its end submerged below surface 44 of pool 28, but above the level of upper vent 30a.

In a postulated large LOCA, steam will be released from reactor vessel 10 and this will increase the pressure in drywell 14. This pressure will, after a short time period, become so great that uppermost vent 30a will clear and steam will be injected into pool 28 housed in wetwell 16. Such steam mixture will mix with the water in pool 28 and lift the water up before being condensed. A short while later, the second vent clears and the process is repeated. Finally, the third vent clears. The staggered clearing will prevent the occurrence of a water hammer phenomenon with attendant possible damage to pressure suppression pool 28.

After depressurization of vessel 10, cold water will be injected into the vessel and after a longer period of time, this water will commence to boil. In presently designed SBWRs, steam emanating from vessel 10 will be condensed by isolation condenser 32 and the condensate returned to vessel 10 via line 40. As the vessel is assumed to be in open contact with drywell 14, it is possible that non-condensibles will flow the steam to isolation condenser 32 and eventually accumulate there. The heat transfer of condenser 32 is reduced greatly in the presence of non-condensibles. In order to avoid significant deterioration of condenser 32, bleedline 42 runs to pool 28. A small fraction of steam also will be transported to suppression pool 28 with the non-condensibles and this steam will condense and heat up the layer of water above end 46 of line 42. The heat capacity of this layer of water is finite and the pressure in wetwell 16 above pool 28 will be given by the amount of non-condensibles in the space and the partial pressure of steam corresponding to the temperature of the uppermost water layer in pool 28.

Figure 3:
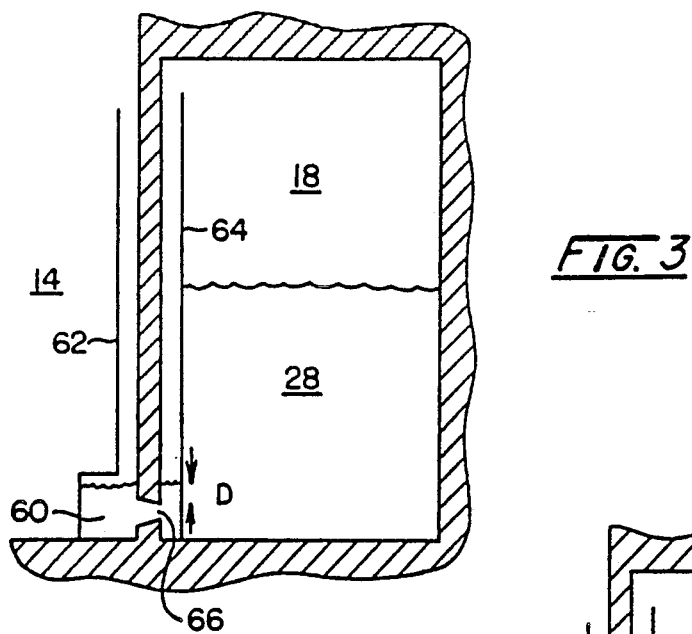
FIGS. 3-5 are exploded views of the drywell/wetwell interface connected by the inventive passive hydraulic vacuum breaker during three different modes of operation.
Figure 4:
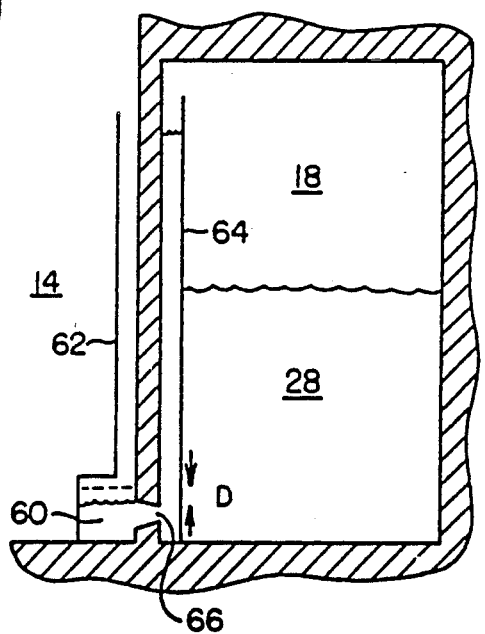
Figure 5:
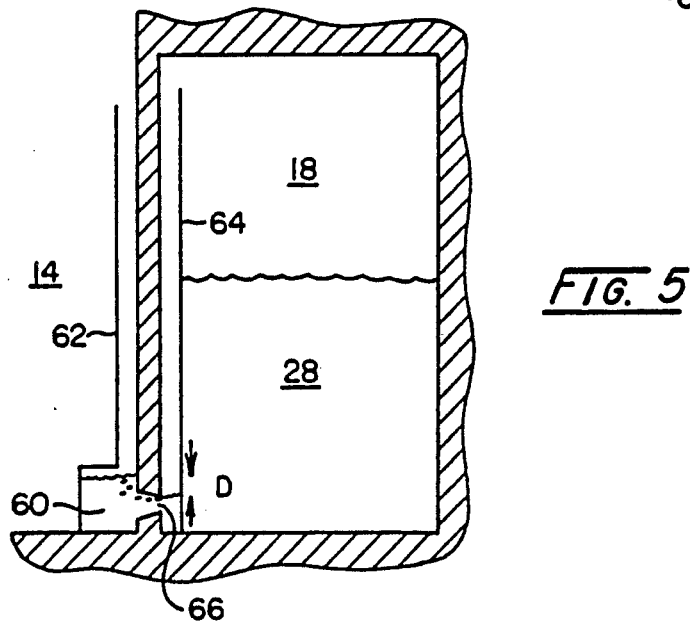

Referring to FIGS. 3-5, the inventive hydraulic vacuum breaker is shown in three different possible conditions. Referring to FIG. 3 initially, liquid reservoir 60 is seen to be located in drywell 14. Standpipe 62 optionally can be used to insure that the liquid in reservoir 60 does not accidentally leak into drywell 14. Standpipe 64 is disposed in wetwell 18 and is connected to reservoir 60 via vent 66. The static head of reservoir 60 is determined by the distance, D, of the duct located below the surface of reservoir 60. The condition depicted at FIG. 3 is a normal operating condition of the nuclear reactor facility.

Referring to FIG. 4, the hydraulic vacuum breaker during blowdown is depicted. During blowdown, the pressure in drywell 14 is expected to increase to an extent that the liquid in reservoir 60 is displaced downwardly at least a distance D. The water level will rise in standpipe 64 during the blowdown phase after an accident has happened. No bypass will occur, provided the pressure differential between the drywell and the wetwell does not exceed the static head in standpipe 64. For a relatively short period in the initial phase of the blowdown, the pressure differential may exceed this head due the accelerated pressure drop and the pressure drop across the penetration. Thereafter, the water will flow back from standpipe 64 to reservoir 60.

Referring to FIG. 5, an "open" condition is shown. In this condition, air will flow from wetwell 18 to drywell 14 after reversal of the pressure differential therebetween and when this differential has exceeded the static head, D. Thus, the vacuum in drywell 14 will be broken and the pressure "equalized" to prevent containment failure.

As to materials of construction, preferably all components are manufactured from materials appropriate for their use within a nuclear BWR. Further, it will be appreciated that various of the components shown and described herein may be altered or varied in accordance with the conventional wisdom in the field and certainly are included within the present invention, provided that such variations do not materially vary within the spirit and precepts of the present invention as described herein.

I claim:

1. In a nuclear reactor facility wherein a nuclear reactor pressure vessel (RPV) is housed within an annular sealed drywell, an annular sealed wetwell houses said drywell, a pressure suppression pool of liquid is disposed in said wetwell and is connected to said drywell by submerged vents, a condenser line connects said drywell to an isolation condenser, a bleedline from said isolation condenser is connected to said pool and terminates under the surface of said pool, the improvement which comprises:

a liquid reservoir disposed in said drywell and a standpipe disposed in said wetwell, said reservoir and said standpipe being connected by a duct which is located below the surface of said reservoir a distance D, the area of said reservoir being at least 25 times larger than the area of said wetwell standpipe.

2. The facility of claim 1 wherein D is 0.4 m.

3. The facility of claim 1 wherein said liquid comprises water.

4. The facility of claim 1 wherein a retaining wall extends above the surface of said reservoir in said drywell.

5. The facility of claim 1 wherein gas in said wetwell will flow to said drywell for negative pressure differentials of greater than about 4 kPa.

* * * * *